(12) United States Patent
Kozuka et al.

(10) Patent No.: US 9,244,322 B2
(45) Date of Patent: Jan. 26, 2016

(54) LIQUID CRYSTAL DISPLAY DEVICE

(75) Inventors: Tomoko Kozuka, Maebashi (JP); Hirokazu Morimoto, Fukaya (JP); Arihiro Takeda, Saitama (JP)

(73) Assignee: JAPAN DISPLAY INC., Tokyo (JP)

( * ) Notice: Subject to any disclaimer, the term of this patent is extended or adjusted under 35 U.S.C. 154(b) by 272 days.

(21) Appl. No.: 13/471,942

(22) Filed: May 15, 2012

(65) Prior Publication Data
US 2013/0033661 A1 Feb. 7, 2013

(30) Foreign Application Priority Data

Aug. 5, 2011 (JP) .................. 2011-172041

(51) Int. Cl.
*G02F 1/1362* (2006.01)
*G02F 1/1343* (2006.01)

(52) U.S. Cl.
CPC .............. *G02F 1/136213* (2013.01); *G02F 2001/134318* (2013.01)

(58) Field of Classification Search
None
See application file for complete search history.

(56) References Cited

U.S. PATENT DOCUMENTS

| | | | |
|---|---|---|---|
| 5,986,724 A * | 11/1999 | Akiyama et al. | 349/41 |
| 6,266,116 B1 | 7/2001 | Ohta et al. | |
| 6,831,725 B2 * | 12/2004 | Niiya | 349/153 |
| 2001/0010575 A1 | 8/2001 | Yoshida et al. | |
| 2004/0165136 A1 | 8/2004 | Sugiyama et al. | |
| 2005/0140890 A1 * | 6/2005 | Kim et al. | 349/139 |
| 2005/0206824 A1 | 9/2005 | Son et al. | |
| 2005/0219453 A1 | 10/2005 | Kubo et al. | |
| 2007/0115234 A1 | 5/2007 | Kim et al. | |
| 2008/0062358 A1 | 3/2008 | Lee et al. | |
| 2008/0180590 A1 | 7/2008 | Lee et al. | |
| 2008/0180623 A1 | 7/2008 | Lee et al. | |
| 2008/0186439 A1 | 8/2008 | Kwon et al. | |
| 2009/0207363 A1 | 8/2009 | Hirosawa | |
| 2011/0234947 A1 | 9/2011 | Hirosawa | |

FOREIGN PATENT DOCUMENTS

| | | |
|---|---|---|
| CN | 1488083 | 4/2004 |
| CN | 1641454 | 7/2005 |
| CN | 101587273 | 11/2009 |
| JP | H 04-229827 | 8/1992 |
| JP | 6-222397 | 8/1994 |
| JP | 7-159807 | 6/1995 |
| JP | 8-76107 A | 3/1996 |

(Continued)

OTHER PUBLICATIONS

U.S. Appl. No. 13/542,049, filed Jul. 5, 2012, Takeda, et al.

(Continued)

*Primary Examiner* — Richard Kim
(74) *Attorney, Agent, or Firm* — Oblon, McClelland, Maier & Neustadt, L.L.P.

(57) ABSTRACT

According to one embodiment, a liquid crystal display device includes a first substrate including an interlayer insulation film covering a first wiring line, a second wiring line and a third wiring line on the interlayer insulation film, and a first electrode which is located between the second wiring line and the third wiring line on the interlayer insulation film, is spaced apart from the second wiring line and the third wiring line, a second substrate including a second electrode which is opposed to each of the second wiring line and the third wiring line, and a liquid crystal layer between the first substrate and the second substrate.

4 Claims, 8 Drawing Sheets

(56) References Cited

FOREIGN PATENT DOCUMENTS

| | | |
|---|---|---|
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 11-52420 A | 2/1999 |
| JP | 2001-91974 A | 4/2001 |
| JP | 2001-290168 A | 10/2001 |
| JP | 2002-277889 A | 9/2002 |
| JP | 2005-3802 | 1/2005 |
| JP | 3644653 | 2/2005 |
| JP | 2005-242307 | 9/2005 |
| JP | 2009-192822 | 8/2009 |

OTHER PUBLICATIONS

U.S. Appl. No. 13/562,647, filed Jul. 31, 2012, Takeda, et al.
U.S. Appl. No. 13/469,458, filed May 11, 2012, Takeda, et al.
U.S. Appl. No. 13/470,578, filed May 14, 2012, Takeda, et al.
Office Action issued on Mar. 11, 2014 in the corresponding Japanese Patent Application No. 2011-172041 (with English Translation).
Office Action issued Aug. 5, 2014, in Japanese Patent Application No. 2011-172041 with English translation.
Office Action issued in Chinese Patent Application No. 201210191652.9, (with English-language Translation).

\* cited by examiner

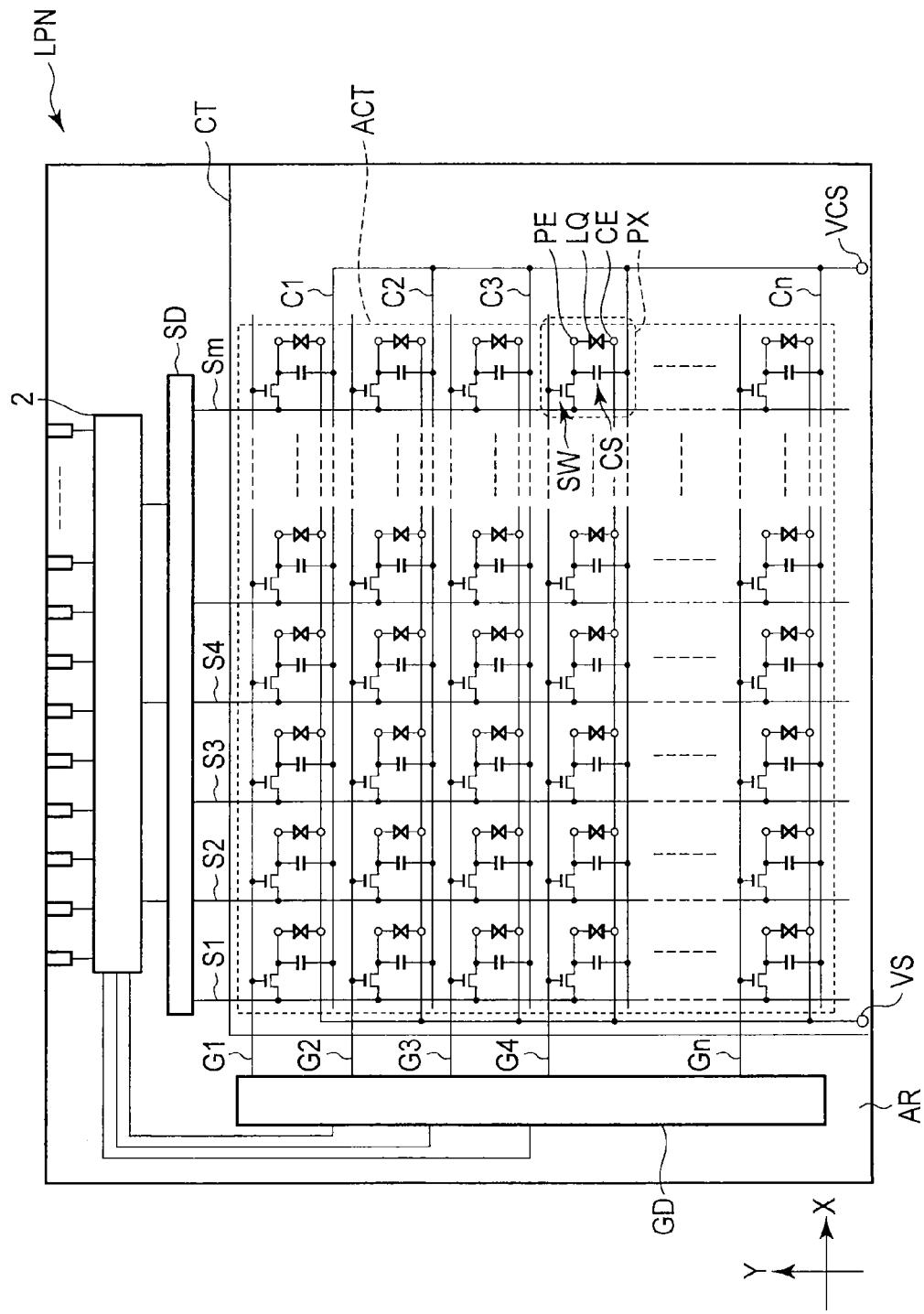
F I G. 1

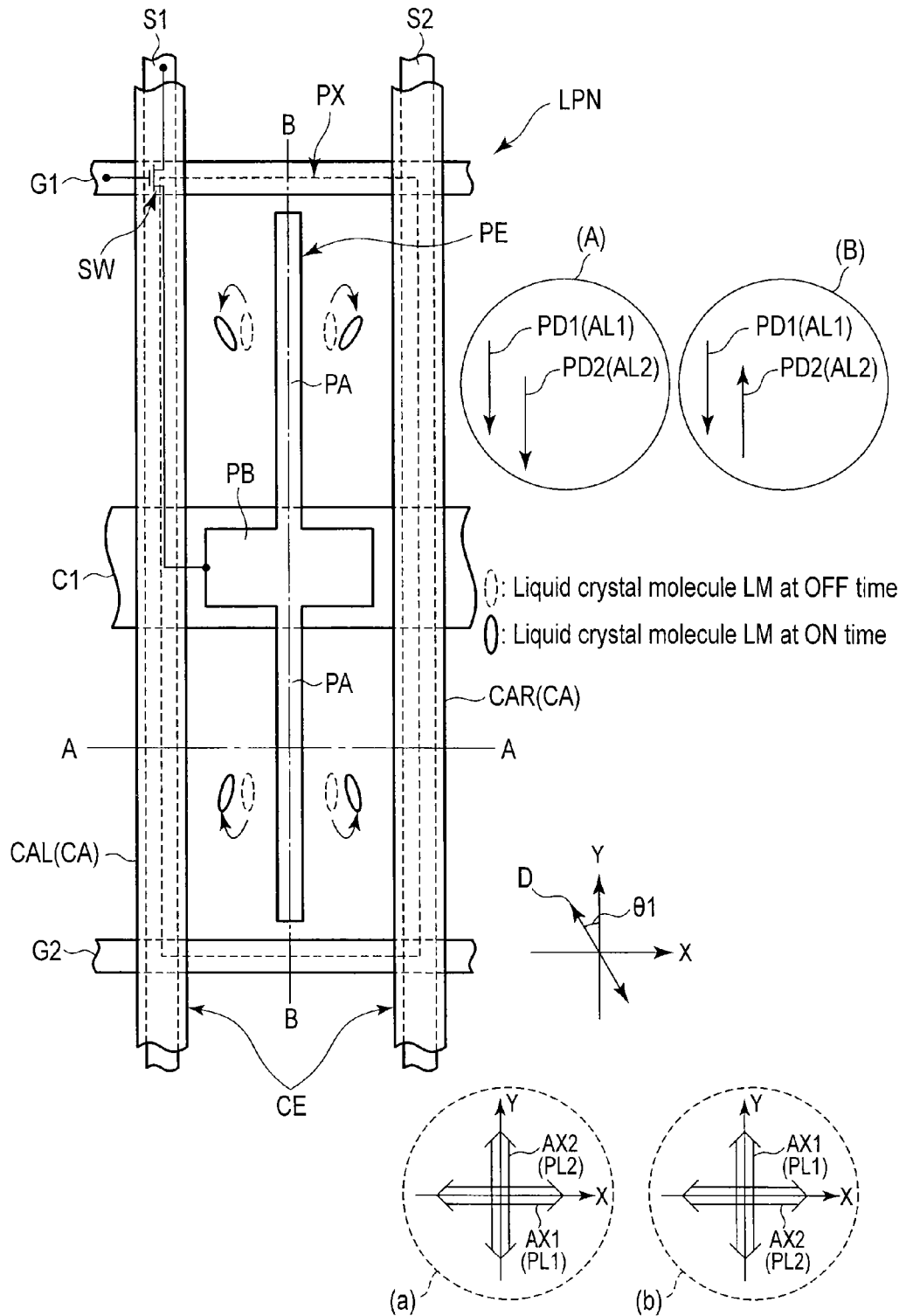
F I G. 2

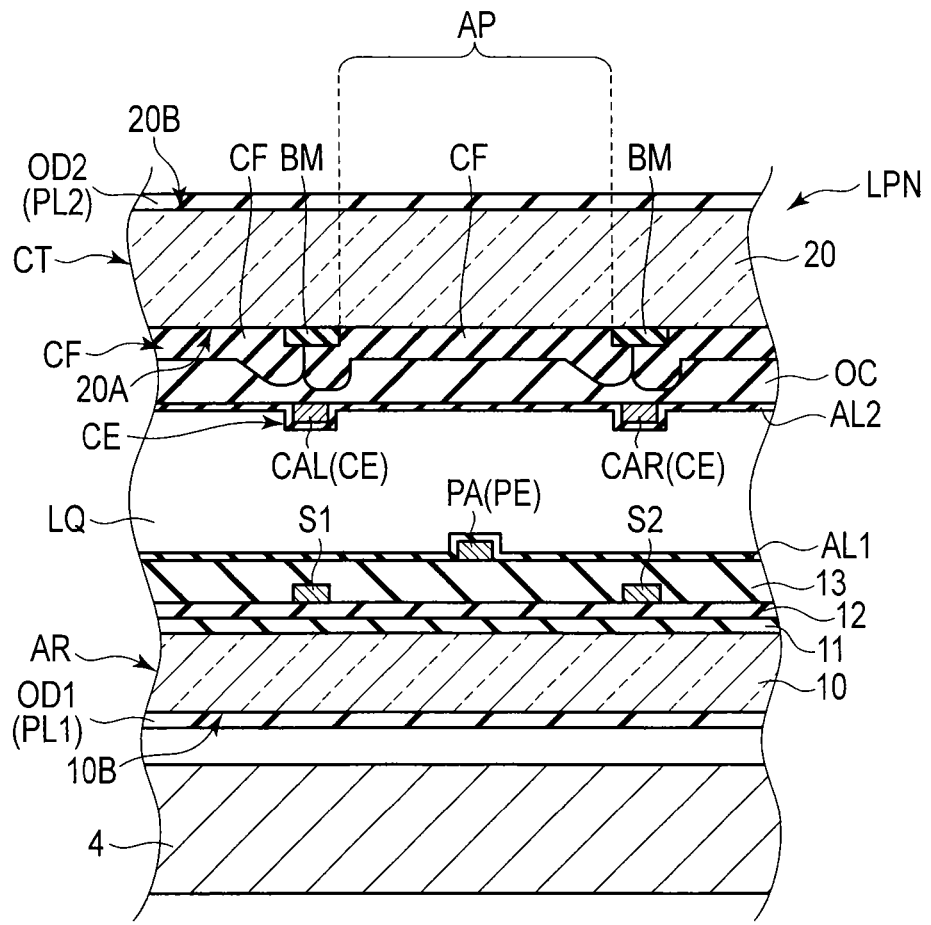
F I G. 3

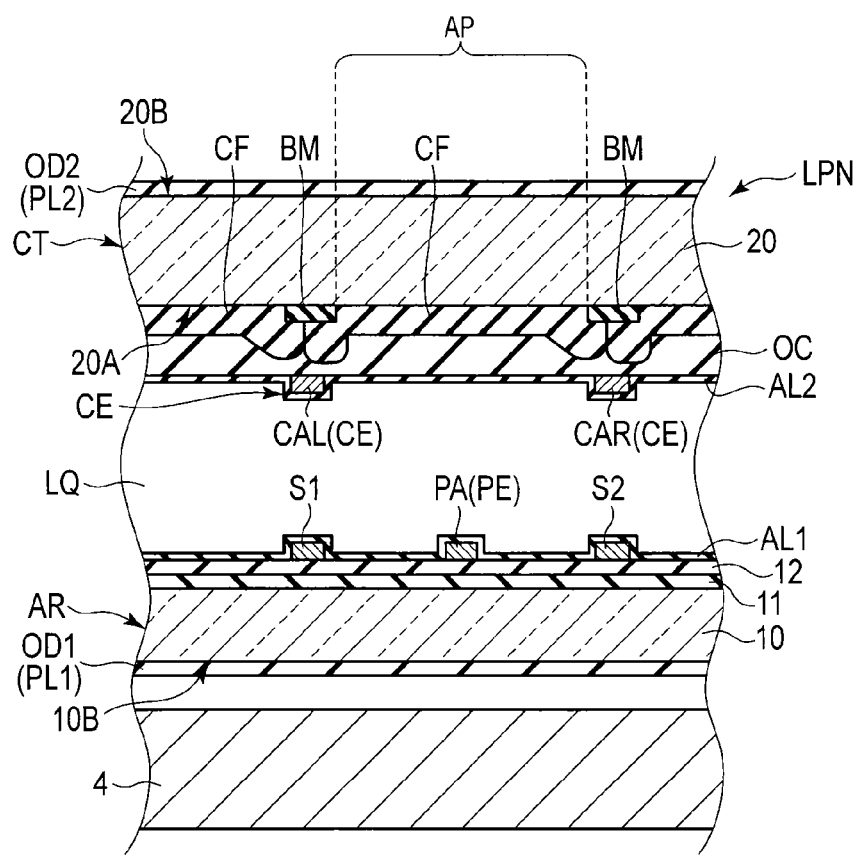
F I G. 5

LIQUID CRYSTAL DISPLAY DEVICE

CROSS-REFERENCE TO RELATED APPLICATIONS

This application is based upon and claims the benefit of priority from prior Japanese Patent Application No. 2011-172041, filed Aug. 5, 2011, the entire contents of which are incorporated herein by reference.

FIELD

Embodiments described herein relate generally to a liquid crystal display device.

BACKGROUND

In recent years, flat-panel display devices have been vigorously developed. By virtue of such advantageous features as light weight, small thickness and low power consumption, special attention has been paid to liquid crystal display devices among others. In particular, in active matrix liquid crystal devices in which switching elements are incorporated in respective pixels, attention is paid to the configuration which makes use of a lateral electric field (including a fringe electric field), such as an IPS (In-Plane Switching) mode or an FFS (Fringe Field Switching) mode. Such a liquid crystal display device of the lateral electric field mode includes pixel electrodes and a counter-electrode, which are formed on an array substrate, and liquid crystal molecules are switched by a lateral electric field which is substantially parallel to a major surface of the array substrate.

On the other hand, there has been proposed a technique wherein a lateral electric field or an oblique electric field is produced between a pixel electrode formed on an array substrate and a counter-electrode formed on a counter-substrate, thereby switching liquid crystal molecules.

BRIEF DESCRIPTION OF THE DRAWINGS

FIG. 1 is a view which schematically illustrates a structure and an equivalent circuit of a liquid crystal display device according to an embodiment.

FIG. 2 is a plan view which schematically shows a structure example of a pixel at a time when a liquid crystal display panel shown in FIG. 1 is viewed from a counter-substrate side.

FIG. 3 is a schematic cross-sectional view, taken along line A-A in FIG. 2, showing a cross-sectional structure of the liquid crystal display panel shown in FIG. 2.

FIG. 5 is a schematic cross-sectional view, taken along line A-A in FIG. 2, showing another cross-sectional structure of the liquid crystal display panel LPN shown in FIG. 2.

DETAILED DESCRIPTION

Figure 4:
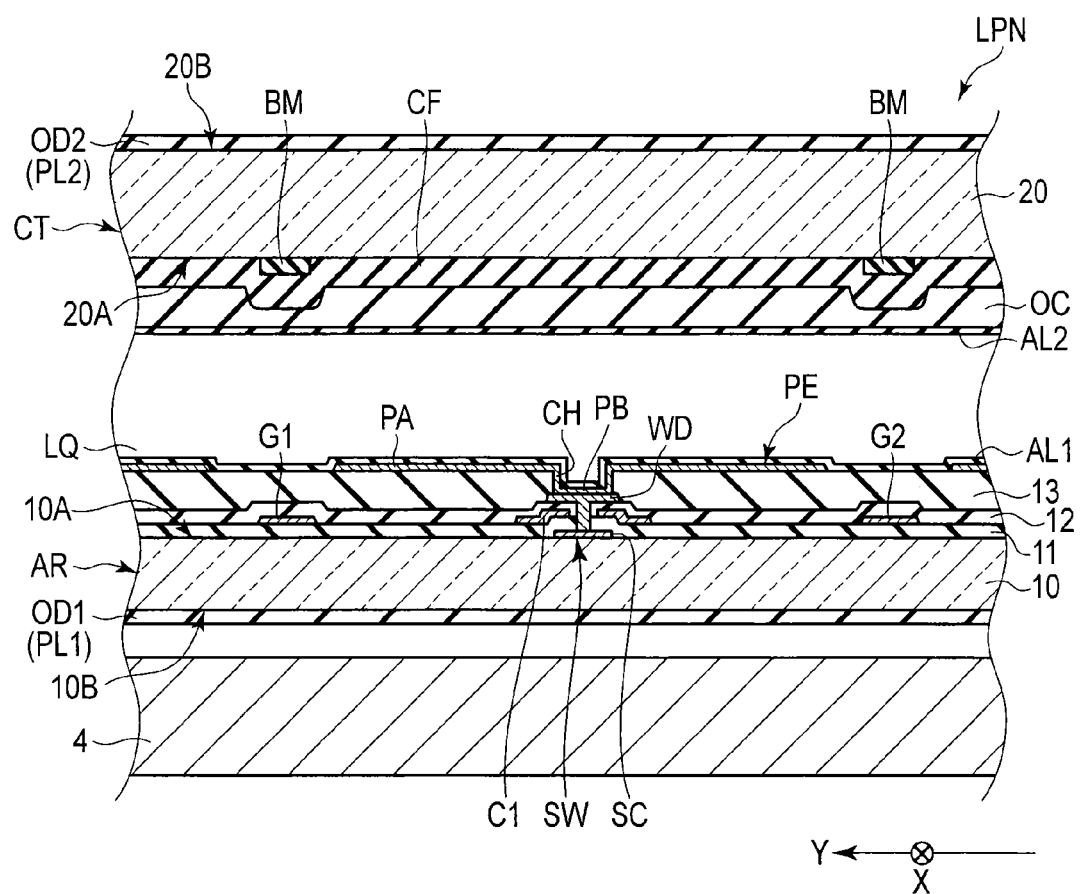
FIG. 4 is a schematic cross-sectional view, taken along line B-B in FIG. 2, showing a cross-sectional structure of the liquid crystal display panel shown in FIG. 2.

In general, according to one embodiment, a liquid crystal display device includes a first substrate including a first insulative substrate, a first wiring line extending in a first direction on an inside of the first insulative substrate, an interlayer insulation film covering the first wiring line, a second wiring line and a third wiring line extending, respectively, on the interlayer insulation film in a second direction which is substantially perpendicular to the first direction, a switching element electrically connected to the first wiring line and the second wiring line, a first electrode which is located between the second wiring line and the third wiring line on the interlayer insulation film, is spaced apart from the second wiring line and the third wiring line, is connected to the switching element, and extends in the second direction, and a first alignment film covering the second wiring line, the third wiring line and the first electrode; a second substrate including a second insulative substrate, a second electrode which extends in the second direction and is opposed to each of the second wiring line and the third wiring line on both sides of the first electrode, on that side of the second insulative substrate, which is opposed to the first substrate, and a second alignment film covering the second electrode; and a liquid crystal layer including liquid crystal molecules held between the first substrate and the second substrate.

According to another embodiment, a liquid crystal display device includes a first substrate including a first electrode which linearly extends, a first wiring line extending in a direction which is substantially perpendicular to a direction of extension of the first electrode, a second wiring line and a third wiring line which extend in a direction substantially parallel to the direction of extension of the first electrode, and a switching element electrically connected to the first wiring line and the second wiring line, the first electrode being located between the second wiring line and the third wiring line, spaced apart from the second wiring line and the third wiring line, connected to the switching element, and formed of an opaque wiring material; a second substrate including a second electrode which is opposed to each of the second wiring line and the third wiring line on both sides of the first electrode, and extends in a direction substantially parallel to the direction of extension of the first electrode; and a liquid crystal layer including liquid crystal molecules held between the first substrate and the second substrate.

According to another embodiment, a liquid crystal display device includes a first substrate including a first insulative substrate, a first wiring line extending in a first direction on an inside of the first insulative substrate, an interlayer insulation film covering the first wiring line, a second wiring line extending on the interlayer insulation film in a second direction which is substantially perpendicular to the first direction, and a first electrode which is formed of the same material as the second wiring line on the interlayer insulation film, is spaced apart from the second wiring line, and extends in the second direction; a second substrate including a second insulative substrate, and a second electrode which extends in the second direction on both sides of the first electrode, on that side of the second insulative substrate, which is opposed to the first substrate; and a liquid crystal layer including liquid crystal molecules held between the first substrate and the second substrate.

Embodiments will now be described in detail with reference to the accompanying drawings. In the drawings, structural elements having the same or similar functions are denoted by like reference numerals, and an overlapping description is omitted.

FIG. 1 is a view which schematically shows a structure and an equivalent circuit of a liquid crystal display device according to an embodiment.

Specifically, the liquid crystal display device includes an active-matrix-type liquid crystal display panel LPN. The liquid crystal display panel LPN includes an array substrate AR which is a first substrate, a counter-substrate CT which is a second substrate that is disposed to be opposed to the array substrate AR, and a liquid crystal layer LQ which is disposed between the array substrate AR and the counter-substrate CT. The liquid crystal display panel LPN includes an active area ACT which displays an image. The active area ACT is composed of a plurality of pixels PX which are arrayed in a matrix of m×n (m and n are positive integers).

The liquid crystal display panel LPN includes, in the active area ACT, an n-number of gate lines G (G1 to Gn), an n-number of storage capacitance lines C (C1 to Cn), and an m-number of source lines S (S1 to Sm). The gate lines G and storage capacitance lines C extend in a first direction X. The gate lines G and storage capacitance lines C neighbor at intervals along a second direction Y crossing the first direction X, and are alternately arranged in parallel. In this example, the first direction X and the second direction Y are perpendicular to each other. The source lines S cross the gate lines G and storage capacitance lines C. The source lines S extend substantially linearly along the second direction Y. It is not always necessary that each of the gate lines G, storage capacitance lines C and source lines S extend linearly, and a part thereof may be bent.

In the example illustrated, the gate lines G and storage capacitance lines C correspond to first wiring lines which linearly extend in the first direction X, and the source lines S correspond to second wiring lines which linearly extend in the second direction Y. There may be a case in which the gate lines G and storage capacitance lines C correspond to second wiring lines which linearly extend in the second direction Y, and the source lines S correspond to first wiring lines which linearly extend in the first direction X.

Each of the gate lines G is led out to the outside of the active area ACT and is connected to a gate driver GD. Each of the source lines S is led out to the outside of the active area ACT and is connected to a source driver SD. At least parts of the gate driver GD and source driver SD are formed on, for example, the array substrate AR, and are connected to a driving IC chip 2 which incorporates a controller.

Each of the pixels PX includes a switching element SW, a pixel electrode PE and a common electrode CE. A storage capacitance CS is formed, for example, between the storage capacitance line C and the pixel electrode PE. The storage capacitance line C is electrically connected to a voltage application module VCS to which a storage capacitance voltage is applied.

In the present embodiment, the liquid crystal display panel LPN is configured such that the pixel electrodes PE are formed on the array substrate AR, and at least a part of the common electrode CE is formed on the counter-substrate CT, and liquid crystal molecules of the liquid crystal layer LQ are switched by mainly using an electric field which is produced between the pixel electrodes PE and the common electrode CE. The electric field, which is produced between the pixel electrodes PE and the common electrode CE, is an oblique electric field which is slightly inclined to an X-Y plane which is defined by the first direction X and second direction Y, or to a substrate major surface of the array substrate AR or a substrate major surface of the counter-substrate CT (or a lateral electric field which is substantially parallel to the substrate major surface).

The switching element SW is composed of, for example, an n-channel thin-film transistor (TFT). The switching element SW is electrically connected to the gate line G and source line S. The switching element SW may be of a top gate type or a bottom gate type. In addition, a semiconductor layer of the switching element SW is formed of, for example, polysilicon, but it may be formed of amorphous silicon.

The pixel electrodes PE are disposed in the respective pixels PX, and are electrically connected to the switching elements SW. The common electrode CE has, for example, a common potential, and is disposed common to the pixel electrodes PE of plural pixels PX via the liquid crystal layer LQ.

The pixel electrode PE is formed of an opaque wiring material, or an electrically conductive material with light-blocking properties or reflectivity. For example, the pixel electrode PE is formed of a metallic material selected from aluminum (Al), titanium (Ti), silver (Ag), molybdenum (Mo), tungsten (W), copper (Cu) and chromium (Cr), or an alloy including one of these elements. Like the pixel electrode PE, the common electrode CE may be formed of a metallic material selected from aluminum (Al), titanium (Ti), silver (Ag), molybdenum (Mo), tungsten (W), copper (Cu) and chromium (Cr), or an alloy including one of these elements.

In the case where one of the pixel electrode PE and common electrode CE is formed of the above-described opaque material, the other may be formed of a light-transmissive, electrically conductive material such as indium tin oxide (ITO) or indium zinc oxide (IZO). In the case where both the pixel electrode PE and common electrode CE are formed of the above-described opaque material, the pixel electrode PE and common electrode CE may be formed of different materials.

The array substrate AR includes a power supply module VS for applying a voltage to the common electrode CE. The power supply module VS is formed, for example, on the outside of the active area ACT. The common electrode CE is led out to the outside of the active area ACT, and is electrically connected to the power supply module VS via an electrically conductive member (not shown).

FIG. 2 is a plan view which schematically shows a structure example of one pixel PX at a time when the liquid crystal display panel LPN shown in FIG. 1 is viewed from the counter-substrate side. FIG. 2 is a plan view in an X-Y plane.

The array substrate AR includes a gate line G1, a gate line G2, a storage capacitance line C1, a source line S1, a source line S2, a switching element SW, a pixel electrode PE, and a first alignment film AL1. The counter-substrate CT includes a common electrode CE and a second alignment film AL2.

The gate line G1, gate line G2 and storage capacitance line C1 extend in the first direction X. The source line S1 and source line S2 extend in the second direction Y. The storage capacitance line C1 is located at a substantially middle point between the gate line G1 and the gate line G2. Specifically, the distance between the gate line G1 and the storage capacitance line C1 in the second direction Y is substantially equal to the distance between the gate line G2 and the storage capacitance line C1 in the second direction Y.

In the example illustrated, the pixel PX corresponds to a grid region which is formed by the gate line G1, gate line G2, source line S1 and source line S2, as indicated by a broken line in FIG. 2. The pixel PX has a rectangular shape having a greater length in the second direction Y than in the first direction X. The length of the pixel PX in the first direction X corresponds to a pitch between the source line S1 and source line S2 in the first direction X. The length of the pixel PX in the second direction Y corresponds to a pitch between the gate line G1 and gate line G2 in the second direction Y. The pixel electrode PE is disposed between the source line S1 and source line S2 which neighbor each other. In addition, the pixel electrode PE is located between the gate line G1 and gate line G2.

In the example illustrated, in the pixel PX, the source line S1 is disposed at a left side end portion, the source line S2 is disposed at a right side end portion, the gate line G1 is disposed at an upper side end portion, and the gate line G2 is disposed at a lower side end portion. Strictly speaking, the source line S1 is disposed to extend over a boundary between the pixel PX and a pixel neighboring on the left side, the source line S2 is disposed to extend over a boundary between the pixel PX and a pixel neighboring on the right side, the gate line G1 is disposed to extend over a boundary between the pixel PX and a pixel neighboring on the upper side, and the gate line G2 is disposed to extend over a boundary between the pixel PX and a pixel neighboring on the lower side. The storage capacitance line C1 is disposed at a substantially central part of the pixel PX.

The switching element SW in the illustrated example is electrically connected to the gate line G1 and source line S1. The switching element SW is provided at an intersection between the gate line G1 and source line S1. A drain line of the switching element SW is formed to extend along the source line S1 and storage capacitance line C1, and is electrically connected to the pixel electrode PE at an area overlapping the storage capacitance line C1. The switching element SW is provided in an area overlapping the source line S1 and storage capacitance line C1, and does not substantially protrude from the area overlapping the source line S1 and storage capacitance line C1, thus suppressing a decrease in area of an aperture portion which contributes to display.

The pixel electrode PE includes a main pixel electrode PA and a sub-pixel electrode PB. The main pixel electrode PA and sub-pixel electrode PB are formed to be integral or continuous, and are electrically connected to each other. In the meantime, in the example illustrated, only the pixel electrode PE which is disposed in one pixel PX is shown, but pixel electrodes of the same shape are disposed in other pixels, the depiction of which is omitted.

The main pixel electrode PA is located between the source line S1 and source line S2. In the illustrated example, the sub-pixel electrode PB crosses an intermediate portion in the second direction Y of the main pixel electrode PA. Accordingly, the main pixel electrode PA linearly extends in the second direction Y from the intersection with the sub-pixel electrode PB to the vicinity of the upper side end portion of the pixel PX and to the vicinity of the lower side end portion of the pixel PX. Specifically, the pixel electrode PE is formed in a cross shape. In addition, the main pixel electrode PA is disposed at a substantially middle position between the source line S1 and source line S2, that is, at a center of the pixel PX. The distance in the first direction X between the source line S1 and the main pixel electrode PA is substantially equal to the distance in the first direction X between the source line S2 and the main pixel electrode PA. The main pixel electrode PA is formed in a strip shape having a substantially equal width in the first direction X.

The sub-pixel electrode PB crosses the main pixel electrode PA and extends along the first direction X. The sub-pixel electrode PB protrudes from the intersection with the main pixel electrode PA toward the source line S1 and source line S2. In the example illustrated, the sub-pixel electrode PB is opposed to the storage capacitance line C1. Specifically, the entirety of the sub-pixel electrode PB is located in an area overlapping the storage capacitance line C1. The sub-pixel electrode PB is electrically connected to the switching element SW. The sub-pixel electrode PB is formed in a strip shape having a substantially equal width in the second direction Y, and is formed with a greater width than the main pixel electrode PA.

The common electrode CE includes main common electrodes CA. The main common electrodes CA extend, in the X-Y plane, linearly in the second direction Y that is substantially parallel to the main pixel electrode PA, on both sides of the main pixel electrode PA. Alternatively, the main common electrodes CA are opposed to the source lines S which extend in the second direction Y, and extend substantially in parallel to the main pixel electrode PA. The main common electrode CA is formed in a strip shape having a substantially equal width in the first direction X.

In the example illustrated, two main common electrodes CA are arranged in parallel with a distance in the first direction. Specifically, the main common electrodes CA include a main common electrode CAL disposed at the left side end portion of the pixel PX, and a main common electrode CAR disposed at the right side end portion of the pixel PX. Strictly speaking, the main common electrode CAL is disposed to extend over a boundary between the pixel PX and a pixel neighboring on the left side, and the main common electrode CAR is disposed to extend over a boundary between the pixel PX and a pixel neighboring on the right side. The main common electrode CAL is opposed to the source line S1, and the main common electrode CAR is opposed to the source line S2. The main common electrode CAL and the main common electrode CAR are electrically connected to each other within the active area or outside the active area.

Paying attention to the positional relationship between the pixel electrode PE and the main common electrodes CA, the pixel electrode PE and the main common electrodes CA are alternately arranged along the first direction X. The main pixel electrode PA and the main common electrodes CA are disposed in parallel to each other. In this case, in the X-Y plane, each of the main common electrodes CA does not overlap the pixel electrode PE. Transmissive regions, through which light can pass, are formed between the pixel electrode PE and the main common electrodes CA.

One pixel electrode PE is located between the main common electrode CAL and main common electrode CAR which neighbor each other. In other words, the main common electrode CAL and main common electrode CAR are disposed on both sides of a position immediately above the pixel electrode PE. Alternatively, the pixel electrode PE is disposed between the main common electrode CAL and main common electrode CAR. Thus, the main common electrode CAL, main pixel electrode PA and main common electrode CAR are arranged in the named order along the first direction X.

The distance between the pixel electrode PE and the common electrode CE in the first direction X is substantially constant. The main pixel electrode PA shown in FIG. 2 is located at a substantially middle point between the main common electrode CAL and main common electrode CAR. Specifically, the distance between the main common electrode CAL and the main pixel electrode PA in the first direction X is substantially equal to the distance between the main common electrode CAR and the main pixel electrode PA in the first direction X.

FIG. 3 is a schematic cross-sectional view, taken along line A-A in FIG. 2, showing a cross-sectional structure of the liquid crystal display panel LPN shown in FIG. 2. FIG. 4 is a schematic cross-sectional view, taken along line B-B in FIG. 2, showing a cross-sectional structure of the liquid crystal display panel LPN shown in FIG. 2. FIG. 3 and FIG. 4 show only parts which are necessary for the description.

A backlight 4 is disposed on the back side of the array substrate AR which constitutes the liquid crystal display panel LPN. Various modes are applicable to the backlight 4. As the backlight 4, use may be made of either a backlight which utilizes a light-emitting diode (LED) as a light source, or a backlight which utilizes a cold cathode fluorescent lamp (CCFL) as a light source. A description of the detailed structure of the backlight 4 is omitted.

The array substrate AR is formed by using a first insulative substrate 10 having light transmissivity. The array substrate AR includes, on the inside of the first insulative substrate 10, the source line S1, source line S2, pixel electrode PE including the main pixel electrode PA, a first insulation film 11, a second insulation film 12, a third insulation film 13, and a first alignment film AL1.

A semiconductor layer SC of a switching element SW is formed on an inner surface 10A of the first insulative substrate 10, and is covered with the first insulation film 11. The gate line G1, gate line G2 and storage capacitance line C1 are formed on the first insulation film 11, and are covered with the second insulation film 12. The source line S1 and source line S2 are formed on the second insulation film 12 and are covered with the third insulation film 13. Specifically, the second insulation film 12 corresponds to an interlayer insulation film between the gate line G1, gate line G2 and storage capacitance line C1, on the one hand, and the source line S1 and source line S2, on the other hand. A drain electrode WD of the switching element SW is formed on the second insulation film 12, is put in contact with the semiconductor layer SC, and is covered with the third insulation film 13. A contact hole CH, which penetrates to the drain electrode WD, is formed in the third insulation film 13. The third insulation film 13 is formed of, e.g. a transparent resin material, and asperities on the surface thereof are smoothed.

The pixel electrode PE including the main pixel electrode PA and sub-pixel electrode PB is formed on the third insulation film 13. The pixel electrode PE is located on the inside of positions immediately above the source line S1 and source line S2. The sub-pixel electrode PB is put in contact with the drain electrode WD via the contact hole CH that is formed in the third insulation film 13.

The first alignment film AL1 is disposed on that surface of the array substrate AR, which is opposed to the counter-substrate CT, and the first alignment film AL1 extends over substantially the entirety of the active area ACT. The first alignment film AL1 covers the pixel electrode PE, etc., and is also disposed over the third insulation film 13. The first alignment film AL1 is formed of a material which exhibits horizontal alignment properties.

In the meantime, the array substrate AR may include a part of the common electrode CE.

The counter-substrate CT is formed by using a second insulative substrate 20 having light transmissivity. The counter-substrate CT includes, on the inside of the second insulative substrate 20, that is, on the side thereof facing the array substrate AR, a black matrix BM, a color filter CF, an overcoat layer OC, the common electrode CE including main common electrode CAL and main common electrode CAR, and a second alignment film AL2.

The black matrix BM partitions the pixels PX and forms an aperture portion AP which is opposed to the pixel electrode PE. Specifically, the black matrix BM is disposed so as to be opposed to wiring portions, such as the source lines, gate lines, storage capacitance lines, and switching elements. In this example, the black matrix BM includes portions extending in the second direction Y, and portions extending in the first direction X. The black matrix BM is disposed on an inner surface 20A of the second insulative substrate 20, which is opposed to the array substrate AR.

The color filter CF is disposed in association with each pixel PX. Specifically, the color filter CF is disposed in the aperture portion AP on the inner surface 20A of the second insulative substrate 20, and a part of the color filter CF extends over the black matrix BM. Color filters CF, which are disposed in the pixels PX neighboring in the first direction X, have mutually different colors. For example, the color filters CF are formed of resin materials which are colored in three primary colors of red, blue and green. A red color filter, which is formed of a resin material that is colored in red, is disposed in association with a red pixel. A blue color filter, which is formed of a resin material that is colored in blue, is disposed in association with a blue pixel. A green color filter, which is formed of a resin material that is colored in green, is disposed in association with a green pixel. Boundaries between these color filters CF are located at positions overlapping the black matrix BM.

The overcoat layer OC covers the color filters CF. The overcoat layer OC reduces the effect of asperities on the surfaces of the color filters CF. The overcoat layer OC is formed of, for example, a transparent resin material.

The main common electrode CAL and main common electrode CAR of the common electrode CE are formed on that side of the overcoat layer OC, which is opposed to the array substrate AR. The main common electrode CAL is located above the source line S1 and is located below the black matrix BM. The main common electrode CAR is located above the source line S2 and is located below the black matrix BM. The width of each of the main common electrode CAL and main common electrode CAR in the first direction X is substantially equal to the width of the black matrix BM which is located thereabove. In the aperture portion AP, the region between the main common electrode CAL and main common electrode CAR, on the one hand, and the main pixel electrode PA, on the other hand, corresponds to a transmissive region through which light can pass.

The second alignment film AL2 is disposed on that surface of the counter-substrate CT, which is opposed to the array substrate AR, and the second alignment film AL2 extends over substantially the entirety of the active area ACT. The second alignment film AL2 covers the main common electrodes CAL, main common electrode CAR and overcoat layer OC. The second alignment film AL2 is formed of a material which exhibits horizontal alignment properties.

The first alignment film AL1 and second alignment film AL2 are subjected to alignment treatment (e.g. rubbing treatment or optical alignment treatment) for initially aligning the liquid crystal molecules of the liquid crystal layer LQ. A first alignment treatment direction PD1, in which the first alignment film AL1 initially aligns the liquid crystal molecules, is parallel to a second alignment treatment direction PD2, in which the second alignment film AL2 initially aligns the liquid crystal molecules. In an example shown in part (A) of FIG. 2, the first alignment treatment direction PD1 and second alignment treatment direction PD2 are parallel to the second direction Y and are identical. In an example shown in part (B) of FIG. 2, the first alignment treatment direction PD1 and second alignment treatment direction PD2 are parallel to the second direction Y and are opposite to each other.

The above-described array substrate AR and counter-substrate CT are disposed such that their first alignment film AL1 and second alignment film AL2 are opposed to each other. In this case, columnar spacers, which are formed of, e.g. a resin material so as to be integral to one of the array substrate AR and counter-substrate CT, are disposed between the first alignment film AL1 of the array substrate AR and the second alignment film AL2 of the counter-substrate CT. Thereby, a predetermined cell gap, for example, a cell gap of 2 to 7 μm, is created. The array substrate AR and counter-substrate CT are attached by a sealant on the outside of the active area ACT in the state in which the predetermined cell gap is created therebetween.

The liquid crystal layer LQ is held in the cell gap which is created between the array substrate AR and the counter-substrate CT, and is disposed between the first alignment film AL1 and second alignment film AL2. The liquid crystal layer LQ includes liquid crystal molecules LM. The liquid crystal layer LQ is composed of a liquid crystal material having a positive (positive-type) dielectric constant anisotropy.

A first optical element OD1 is attached, by, e.g. an adhesive, to an outer surface of the array substrate AR, that is, an outer surface 10B of the first insulative substrate 10 which constitutes the array substrate AR. The first optical element OD1 is located on that side of the liquid crystal display panel LPN, which is opposed to the backlight 4, and controls the polarization state of incident light which enters the liquid crystal display panel LPN from the backlight 4. The first optical element OD1 includes a first polarizer PL1 having a first polarization axis (or first absorption axis) AX1. In the meantime, another optical element, such as a retardation plate, may be disposed between the first polarizer PL1 and the first insulative substrate 10.

A second optical element OD2 is attached, by, e.g. an adhesive, to an outer surface of the counter-substrate CT, that is, an outer surface 20B of the second insulative substrate 20 which constitutes the counter-substrate CT. The second optical element OD2 is located on the display surface side of the liquid crystal display panel LPN, and controls the polarization state of emission light emerging from the liquid crystal display panel LPN. The second optical element OD2 includes a second polarizer PL2 having a second polarization axis (or second absorption axis) AX2. In the meantime, another optical element, such as a retardation plate, may be disposed between the second polarizer PL2 and the second insulative substrate 20.

The first polarization axis AX1 of the first polarizer PL1 and the second polarization axis AX2 of the second polarizer PL2 have a positional relationship of crossed Nicols. In this case, one of the polarizers is disposed such that the polarization axis thereof is parallel or perpendicular to the direction of extension of the main pixel electrode PA or main common electrode CA. Specifically, when the direction of extension of the main pixel electrode PA or main common electrode CA is the second direction Y, the polarization axis of one polarizer is parallel to the second direction Y or is substantially perpendicular to the second direction Y.

Alternatively, one of the polarizers is disposed such that the polarization axis thereof is parallel or perpendicular to the initial alignment direction of liquid crystal molecules, i.e., the first alignment treatment direction PD1 or second alignment treatment direction PD2. When the initial alignment direction is parallel to the second direction Y, the polarization axis of one polarizer is parallel to the second direction Y or is parallel to the first direction X.

In an example shown in part (a) of FIG. 2, the first polarizer PL1 is disposed such that the first polarization axis AX1 thereof is perpendicular to the direction of extension of the main pixel electrode PA or the initial alignment direction (second direction Y) of liquid crystal molecules LM, and the second polarizer PL2 is disposed such that the second polarization axis AX2 thereof is parallel to the direction of extension of the main pixel electrode PA or the initial alignment direction of liquid crystal molecules LM.

In addition, in an example shown in part (b) of FIG. 2, the second polarizer PL2 is disposed such that the second polarization axis AX2 thereof is perpendicular to the direction of extension of the main pixel electrode PA or the initial alignment direction (second direction Y) of liquid crystal molecules LM, and the first polarizer PL1 is disposed such that the first polarization axis AX1 thereof is parallel to the direction of extension of the main pixel electrode PA or the initial alignment direction of liquid crystal molecules LM.

Next, the operation of the liquid crystal display panel LPN having the above-described structure is described with reference to FIG. 2 to FIG. 4.

Specifically, in a state in which no voltage is applied to the liquid crystal layer LQ, that is, in a state (OFF time) in which no electric field is produced between the pixel electrode PE and common electrode CE, the liquid crystal molecule LM of the liquid crystal layer LQ is aligned such that the major axis thereof is positioned in the first alignment treatment direction PD1 of the first alignment film AL1 and the second alignment treatment direction PD2 of the second alignment film AL2. This OFF time corresponds to the initial alignment state, and the alignment direction of the liquid crystal molecule LM at the OFF time corresponds to the initial alignment direction.

Strictly speaking, the liquid crystal molecule LM is not always aligned in parallel to the X-Y plane, and, in many cases, the liquid crystal molecule LM is pre-tilted. Thus, the initial alignment direction of the liquid crystal molecule LM corresponds to a direction in which the major axis of the liquid crystal molecule LM at the OFF time is orthogonally projected onto the X-Y plane. In the description below, for the purpose of simplicity, it is assumed that the liquid crystal molecule LM is aligned in parallel to the X-Y plane, and the liquid crystal molecule LM rotates in a plane parallel to the X-Y plane.

In this case, each of the first alignment treatment direction PD1 and the second alignment treatment direction PD2 is substantially parallel to the second direction Y. At the OFF time, the liquid crystal molecule LM is initially aligned such that the major axis thereof is substantially parallel to the second direction Y, as indicated by a broken line in FIG. 2. Specifically, the initial alignment direction of the liquid crystal molecule LM is parallel to the second direction Y (or 0° to the second direction Y).

When the first alignment treatment direction PD1 and the second alignment treatment direction PD2 are parallel and identical to each other, as in the example illustrated, the liquid crystal molecules LM are substantially horizontally aligned (the pre-tilt angle is substantially zero) in the middle part of the liquid crystal layer LQ in the cross section of the liquid crystal layer LQ, and the liquid crystal molecules LM are aligned with such pre-tilt angles that the liquid crystal molecules LM become symmetric in the vicinity of the first alignment film AL1 and in the vicinity of the second alignment film AL2, with respect to the middle part as the boundary (splay alignment). In the state in which the liquid crystal molecules LM are splay-aligned, optical compensation can be made by the liquid crystal molecules LM in the vicinity of the first alignment film AL1 and the liquid crystal molecules LM in the vicinity of the second alignment film AL2, even in a direction inclined to the normal direction of the substrate. Therefore, when the first alignment treatment direction PD1 and the second alignment treatment direction PD2 are parallel and identical to each other, light leakage is small in the case of black display, a high contrast ratio can be realized, and the display quality can be improved.

In the meantime, when the first alignment treatment direction PD1 and the second alignment treatment direction PD2 are parallel and opposite to each other, the liquid crystal molecules LM are aligned with substantially equal pre-tilt angles, in the cross section of the liquid crystal layer LQ, in the vicinity of the first alignment film AL1, in the vicinity of the second alignment film AL2, and in the middle part of the liquid crystal layer LQ (homogeneous alignment).

Part of light from the backlight 4 passes through the first polarizer PL1 and enters the liquid crystal display panel LPN. The polarization state of the light, which enters the liquid crystal display panel LPN, is linear polarization perpendicular to the first polarization axis AX1 of the first polarizer PL1. The polarization state of such linear polarization hardly varies when the light passes through the liquid crystal display panel LPN at the OFF time. Thus, the linearly polarized light, which has passed through the liquid crystal display panel LPN, is absorbed by the second polarizer PL2 that is in the positional relationship of crossed Nicols in relation to the first polarizer PL1 (black display).

On the other hand, in a state in which a voltage is applied to the liquid crystal layer LQ, that is, in a state (ON time) in which a potential difference is produced between the pixel electrode PE and common electrode CE, a lateral electric field (or an oblique electric field), which is substantially parallel to the substrates, is produced between the pixel electrode PE and the common electrode CE. The liquid crystal molecules LM are affected by the electric field, and the major axes thereof rotate within a plane which is parallel to the X-Y plane, as indicated by solid lines in the Figure.

In the example shown in FIG. 2, the liquid crystal molecule LM in a lower half part of the region between the pixel electrode PE and main common electrode CAL rotates clockwise relative to the second direction Y, and is aligned in a lower left direction in the Figure. The liquid crystal molecule LM in an upper half part of the region between the pixel electrode PE and main common electrode CAL rotates counterclockwise relative to the second direction Y, and is aligned in an upper left direction in the Figure. The liquid crystal molecule LM in a lower half part of the region between the pixel electrode PE and main common electrode CAR rotates counterclockwise relative to the second direction Y, and is aligned in a lower right direction in the Figure. The liquid crystal molecule LM in an upper half part of the region between the pixel electrode PE and main common electrode CAR rotates clockwise relative to the second direction Y, and is aligned in an upper right direction in the Figure.

As has been described above, in the state in which the electric field is produced between the pixel electrode PE and common electrode CE in each pixel PX, the liquid crystal molecules LM are aligned in a plurality of directions, with boundaries at positions overlapping the pixel electrode PE, and domains are formed in the respective alignment directions. Specifically, a plurality of domains are formed in one pixel PX.

At such ON time, part of backlight, which is incident on the liquid crystal display panel LPN from the backlight 4, passes through the first polarizer PL1, and enters the liquid crystal display panel LPN. The light entering the liquid crystal display panel LPN is linearly polarized light which is perpendicular to the first polarization axis AX1 of the first polarizer PL1. The polarization state of such linearly polarized light varies depending on the alignment state of the liquid crystal molecules LM when the light passes through the liquid crystal layer LQ. For example, when linearly polarized light, which is parallel to the first direction X, has entered the liquid crystal display panel LPN, the light is affected, while passing through the liquid crystal layer LQ, by a retardation of $\lambda/2$ by the liquid crystal molecules which are aligned in a 45°-225° azimuth direction or a 135°-315° azimuth direction relative to the first direction X ($\lambda$ is a wavelength of light passing through the liquid crystal layer LQ). Thereby, the polarization state of the light, which has passed through the liquid crystal layer LQ, becomes linear polarization parallel to the second direction Y. Thus, at the ON time, at least part of the light emerging from the liquid crystal layer LQ passes through the second polarizer PL2 (white display).

According to the present embodiment, the pixel electrode PE is formed of an opaque wiring material, namely, a metallic material selected from aluminum (Al), titanium (Ti), silver (Ag), molybdenum (Mo), tungsten (W), copper (Cu) and chromium (Cr), or an alloy including one of these elements. Thus, compared to the case where both the pixel electrode PE and common electrode CE are formed of ITO or IZO, the amount of use of indium (In) can be reduced. In addition, the common electrode CE can also be formed of the above-described opaque wiring material. When both the pixel electrode PE and common electrode CE are formed of the opaque wiring material, an indium-free configuration can be realized.

Over the pixel electrode PE or over the common electrode CE, since a lateral electric field is hardly produced (or an electric field enough to drive liquid crystal molecules LM is not produced) even at the ON time, as well as the OFF time, the liquid crystal molecules LM scarcely move from the initial alignment direction, like the case of the OFF time. Thus, even if the pixel electrode PE and common electrode CE are formed of a light-transmissive, electrically conductive material such as ITO, little backlight passes through these regions, and these regions hardly contribute to display at the ON time. Specifically, compared to the case where the pixel electrode PE and common electrode CE are formed of a transparent, electrically conductive material, even if the pixel electrode PE and common electrode CE are formed of the opaque wiring material, as in the present embodiment, it is possible to suppress a decrease in transmittance at the ON time, or to suppress a decrease in area of the aperture portion AP.

In the present embodiment in which at least one of the pixel electrode PE and common electrode CE is formed of the above-described opaque wiring material, linearly polarized light, which has entered the liquid crystal display panel LPN, is substantially parallel or perpendicular to the direction of extension of the edges of the pixel electrode PE or common electrode CE. Thus, the plane of polarization of the linearly polarized light, which is reflected by the edges of the pixel electrode PE or common electrode CE, is hardly disturbed, and the plane of polarization at the time of passing through the first polarizer PL1, which is a polarizer, can be maintained. Accordingly, at the OFF time, since linearly polarized light, which has passed through the liquid crystal display panel LPN, is sufficiently absorbed by the second polarizer PL2, which is an analyzer, light leakage can be suppressed. Specifically, the transmittance can be sufficiently reduced at the time of black display, and the decrease in contrast ratio can be suppressed. In addition, since there is no need to increase the width of the black matrix BM in order to cope with light leakage in the vicinity of the pixel electrode PE or common electrode CE, it is possible to suppress a decrease in area of the aperture portion AP or a decrease in transmittance at the ON time. Therefore, degradation in display quality can be suppressed.

In addition, according to the present embodiment, a high transmittance can be obtained in the inter-electrode gap between the pixel electrode PE and the common electrode CE. Thus, a transmittance per pixel can sufficiently be increased by increasing the inter-electrode distance between the main pixel electrode and the main common electrode. As regards product specifications in which the pixel pitch is different, the peak condition of the transmittance distribution can be used by varying the inter-electrode distance between the main pixel electrode and the main common electrode. Specifically, in the display mode of the present embodiment, products with various pixel pitches can be provided by setting the inter-electrode distance, without necessarily requiring fine electrode processing, as regards the product specifications from low-resolution product specifications with a relatively large pixel pitch to high-resolution product specifications with a relatively small pixel pitch. Therefore, requirements for high transmittance and high resolution can easily be realized.

According to the present embodiment, in the region overlapping the black matrix BM, the transmittance is sufficiently lowered. The reason for this is that the electric field does not leak to the outside of the pixel from the position of the common electrode CE that is located above the source line S, and an undesired lateral electric field does not occur between pixels which neighbor each other with the black matrix BM interposed, and therefore the liquid crystal molecules LM in the region overlapping the black matrix BM keep the initial alignment state, like the case of the OFF time (or black display time). Accordingly, even when the colors of the color filters are different between neighboring pixels, the occurrence of color mixture can be suppressed, and the decrease in color reproducibility or the decrease in contrast ratio can be suppressed.

When misalignment occurs between the array substrate AR and the counter-substrate CT, there are cases in which a difference occurs in the horizontal inter-electrode distance between the pixel electrode PE and the common electrodes CE on both sides of the pixel electrode PE. However, since such misalignment commonly occurs in all pixels PX, the electric field distribution does not differ between the pixels PX, and the influence on the display of images is very small. In addition, even when misalignment occurs between the array substrate AR and the counter-substrate CT, leakage of an undesired electric field to the neighboring pixel can be suppressed. Thus, even when the colors of the color filters differ between neighboring pixels, the occurrence of color mixture can be suppressed, and the decrease in color reproducibility or the decrease in contrast ratio can be suppressed.

According to the present embodiment, the main common electrodes CA are opposed to the source lines S. In particular, when the main common electrode CAL and main common electrode CAR are disposed immediately above the source line S1 and source line S2, respectively, the aperture portion AP can be increased and the transmittance of the pixel PX can be improved, compared to the case in which the main common electrode CAL and main common electrode CAR are disposed on the pixel electrode PE side of the source line S1 and source line S2.

Furthermore, by disposing the main common electrode CAL and main common electrode CAR immediately above the source line S1 and source line S2, respectively, the inter-electrode distance between the pixel electrode PE, on the one hand, and the main common electrode CAL and main common electrode CAR, on the other hand, can be increased, and a lateral electric field, which is closer to a horizontal lateral electric field, can be produced. Therefore, a wide viewing angle, which is the advantage of an IPS mode, etc. in the conventional structure, can be maintained.

According to the present embodiment, a plurality of domains can be formed in one pixel. Thus, the viewing angle can optically be compensated in plural directions, and a wide viewing angle can be realized.

The above-described example is directed to the case where the initial alignment direction of liquid crystal molecules LM is parallel to the second direction Y. However, the initial alignment direction of liquid crystal molecules LM may be an oblique direction D which obliquely crosses the second direction Y, as shown in FIG. 2. An angle θ1 formed between the second direction Y and the initial alignment direction D is 0° or more and 45° or less. From the standpoint of alignment control of liquid crystal molecules LM, it is desirable that the initial alignment direction of liquid crystal molecules LM be a direction in a range of 0° or more and 20° or less, relative to the second direction Y.

The above-described example relates to the case in which the liquid crystal layer LQ is composed of a liquid crystal material having a positive (positive-type) dielectric constant anisotropy. Alternatively, the liquid crystal layer LQ may be composed of a liquid crystal material having a negative (negative-type) dielectric constant anisotropy. Although a detailed description is omitted, in the case of the negative-type liquid crystal material, since the positive/negative state of dielectric constant anisotropy is revered, it is desirable that the above-described formed angle θ1 be within the range of 45° or more and 90° or less, preferably the range of 70° or more and 90° or less.

Next, another structure example of the present embodiment is described.

Figure 6:
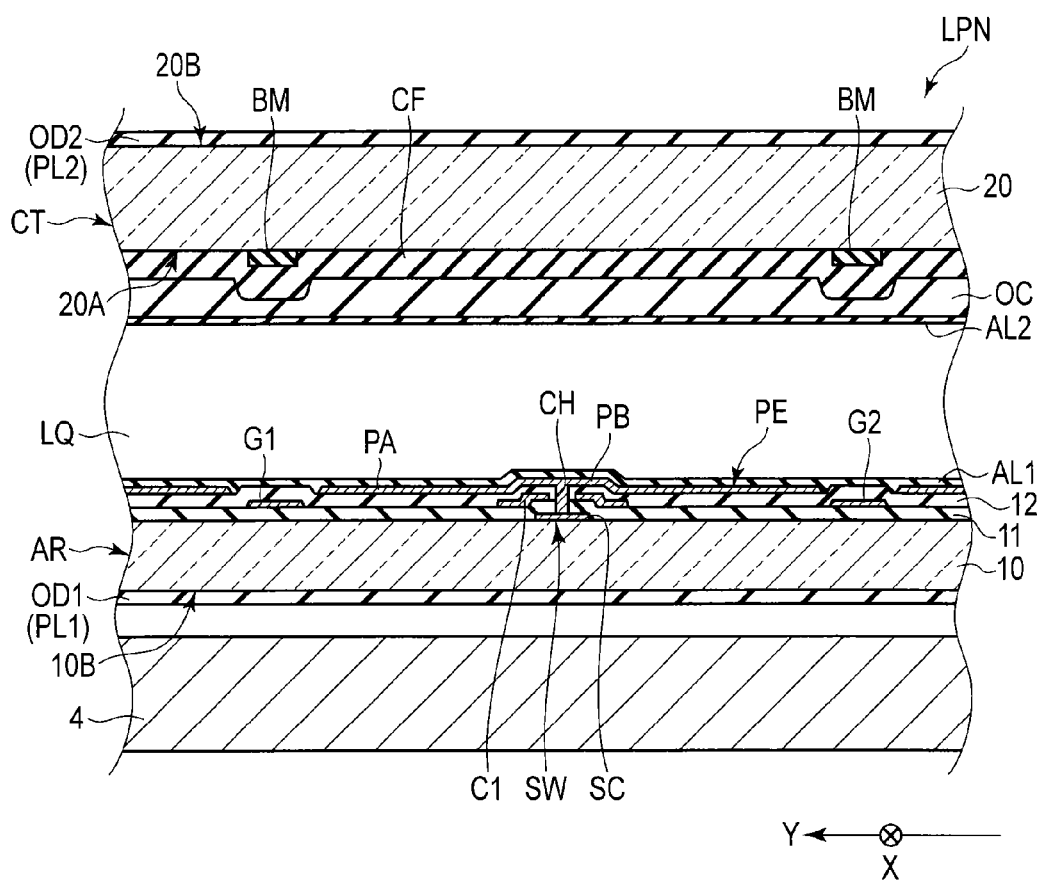
FIG. 6 is a schematic cross-sectional view, taken along line B-B in FIG. 2, showing another cross-sectional structure of the liquid crystal display panel LPN shown in FIG. 2.

FIG. 5 is a schematic cross-sectional view, taken along line A-A in FIG. 2, showing another cross-sectional structure of the liquid crystal display panel LPN shown in FIG. 2. FIG. 6 is a schematic cross-sectional view, taken along line B-B in FIG. 2, showing another cross-sectional structure of the liquid crystal display panel LPN shown in FIG. 2. FIG. 5 and FIG. 6 show only parts which are necessary for the description.

The structure example illustrated differs from the structure example shown in FIG. 3 and FIG. 4 in that the pixel electrode PE is formed in the same layer as the source line S1 and source line S2, and the third insulation film 13 is dispensed with.

Specifically, the source line S1, source line S2 and pixel electrode PE are formed on the second insulation film 12 which covers the gate line G1, gate line G2 and storage capacitance line C1. The pixel electrode PE is located between the source line S1 and source line S2 and is spaced apart from the source line S1 and source line S2. The main pixel electrode PA extends in the second direction Y. The sub-pixel electrode PB is put in contact with the semiconductor layer SC via a relatively shallow contact hole CH which is formed in the first insulation film 11 and second insulation film 12, and is electrically connected to the switching element SW. The source line S1, source line S2 and pixel electrode PE are covered with the first alignment film AL1. In addition, the first alignment film AL1 is also disposed on the second insulation film 12.

According to this structure example, the pixel electrode PE can be formed of the same material as the source lines S which are formed in the same layer as the pixel electrode PE. Thus, in the step of forming the source lines S, the pixel electrode PE can be formed at the same time, and the step of separately forming the pixel electrode PE can be omitted, compared to the structure example shown in FIG. 3, etc. In addition, in the example illustrated, the step of forming the third insulation film 13 can be omitted. Therefore the manufacturing cost can be reduced.

In the structure example shown in FIG. 3, etc., a deep contact hole CH needs to be formed in the relatively thick third insulation film 13, in order to electrically connect the pixel electrode PE and drain electrode WD. The third insulation film 13 is formed of a resin material with a relatively large thickness, in order to planarize the surface of the array substrate AR. Hence, the contact hole CH, which extends from the pixel electrode PE formed on the surface of the third insulation film 13 to the drain electrode WD tends to become deep and large in diameter. In the vicinity of such contact hole CH, the alignment of liquid crystal molecules LM tends to be easily disturbed due to asperities, or the like, of the contact hole CH, and light leakage tends to easily occur at the OFF time. Such light leakage needs to be blocked, for example, by increasing the width of the storage capacitance line C1 in the second direction Y.

On the other hand, in the structure example shown in FIG. 5 and FIG. 6, the pixel electrode PE is electrically connected to the semiconductor layer SC of the switching element SW via the relatively shallow contact hole CH. Such contact hole CH, which penetrates the first insulation film 11 and second insulation film 12, has a smaller diameter than the contact hole formed in the third insulation film 13, and the influence of its asperities upon the alignment of liquid crystal molecules LM is small. Therefore, light leakage at the OFF time can be suppressed, and the contrast ratio can be improved. In addition, there is no need to increase, more than necessary, the width of the storage capacitance line C1 in order to block light leakage, and it is possible to suppress a decrease in area of the aperture portion AP.

In this structure example, the first alignment treatment direction PD1 of the first alignment film AL1 is parallel to the long-side direction (e.g. second direction Y) of the substantially rectangular pixel PX. Accordingly, it is some wiring lines (e.g. the gate lines and storage capacitance line extending in the first direction X) and the short sides of the pixel electrode PE that cross the first alignment treatment direction PD1 in one pixel. In other words, the first alignment treatment direction PD1 crosses neither other wiring lines (e.g. the source lines extending in the second direction Y) nor the long sides of the pixel electrode PE. Thus, even if there is an area in which alignment treatment is not sufficiently performed due to asperities of the wiring lines and electrode, the area in which alignment treatment is not sufficiently performed can be made smaller than in the case where the first alignment film AL1 is subjected to alignment treatment in the other direction, that is, the direction crossing the long-side direction of the pixel PX. Specifically, since an area in which alignment treatment is not sufficiently performed occurs along the wiring lines crossing the first alignment treatment direction PD1 or the short sides of the pixel electrode PE, the area in which alignment treatment is not sufficiently performed can be decreased by decreasing the length of the side crossing the first alignment treatment direction PD1. Also in the case where the long-side direction of the pixel PX is parallel to the first direction X, the same applies if the first alignment treatment direction PD1 is parallel to the first direction X.

In the present embodiment, the structure of the pixel PX is not limited to the example shown in FIG. 2.

Figure 7:
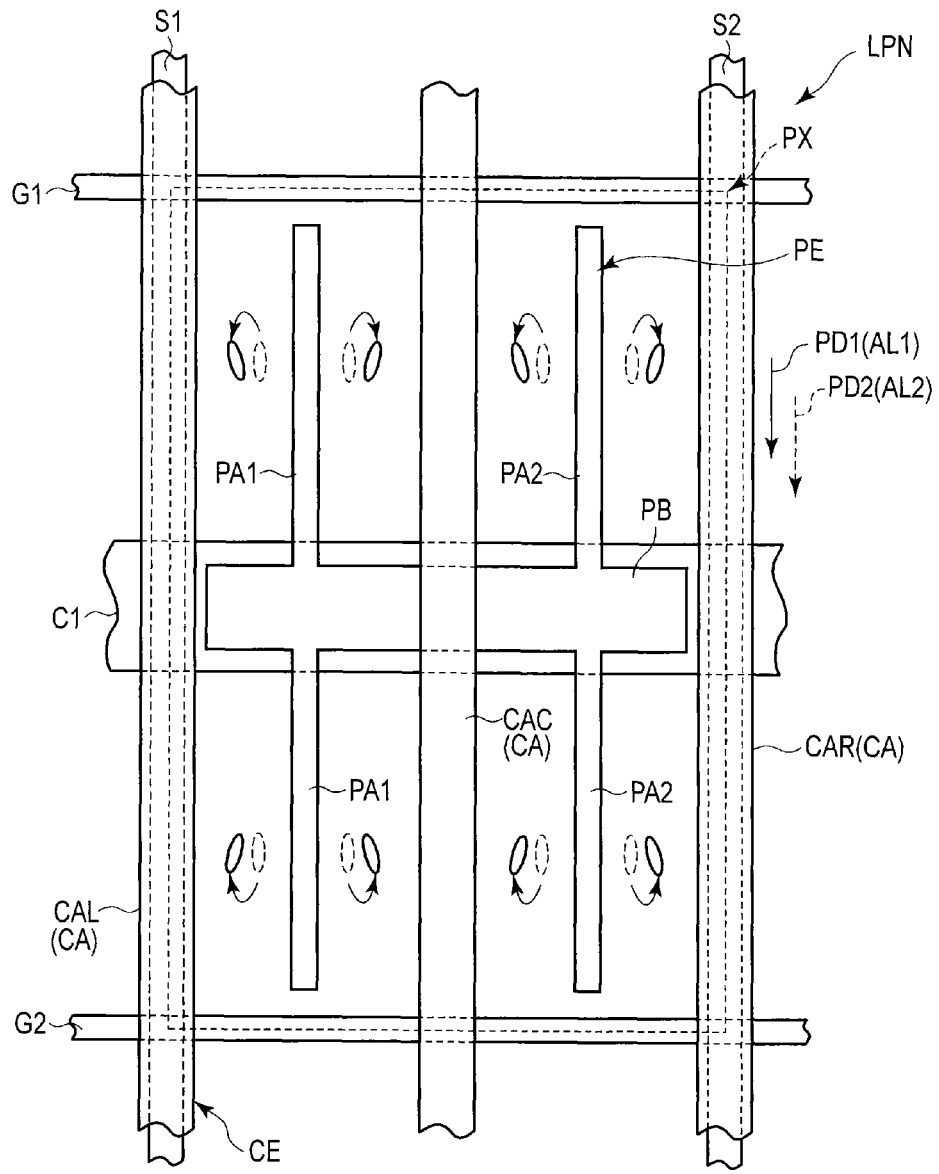
FIG. 7 is a plan view which schematically shows another structure example of a pixel at a time when the liquid crystal display panel shown in FIG. 1 is viewed from the counter-substrate side.

FIG. 7 is a plan view which schematically shows another structure example of the pixel PX at a time when the liquid crystal display panel LPN shown in FIG. 1 is viewed from the counter-substrate side.

This structure example differs from the structure example shown in FIG. 2 in that the pixel electrode PE includes a plurality of main pixel electrodes PA which are arranged substantially in parallel with an interval in the first direction X, and that the common electrode CE includes a main common electrode CAC between the neighboring main pixel electrodes PA, in addition to the main common electrode CAL at the left side end portion of the pixel PX and the main common electrode CAR at the right side end portion of the pixel PX.

Specifically, the pixel electrode PE includes a main pixel electrode PA1, a main pixel electrode PA2 and a sub-pixel electrode PB. The main pixel electrode PA1, main pixel electrode PA2 and sub-pixel electrode PB are mutually electrically connected. The main pixel electrode PA1 and main pixel electrode PA2 are arranged substantially in parallel with an interval in the first direction X. The main pixel electrode PA1 and main pixel electrode PA2 linearly extend in the second direction Y from the sub-pixel electrode PB to the vicinity of the upper side end portion of the pixel PX and to the vicinity of the lower side end portion of the pixel PX. The sub-pixel electrode PB extends along the first direction X. The sub-pixel electrode PB is located in an area overlapping the storage capacitance line C1, and is electrically connected to the switching element SW (not shown).

The common electrode CE includes the main common electrode CAL, main common electrode CAR and main common electrode CAC. The main common electrode CAL, main common electrode CAR and main common electrode CAC are mutually electrically connected. The main common electrode CAL, main common electrode CAR and main common electrode CAC are arranged substantially in parallel with intervals in the first direction X, and extend in the second direction Y. The main common electrode CAL is located on the left side of the main pixel electrode PA1, the main common electrode CAR is located on the right side of the main pixel electrode PA2, and the main common electrode CAC is located between the main pixel electrode PA1 and main pixel electrode PA2.

In this structure example, too, the same advantageous effects as with the above-described structure example can be obtained.

Figure 8:
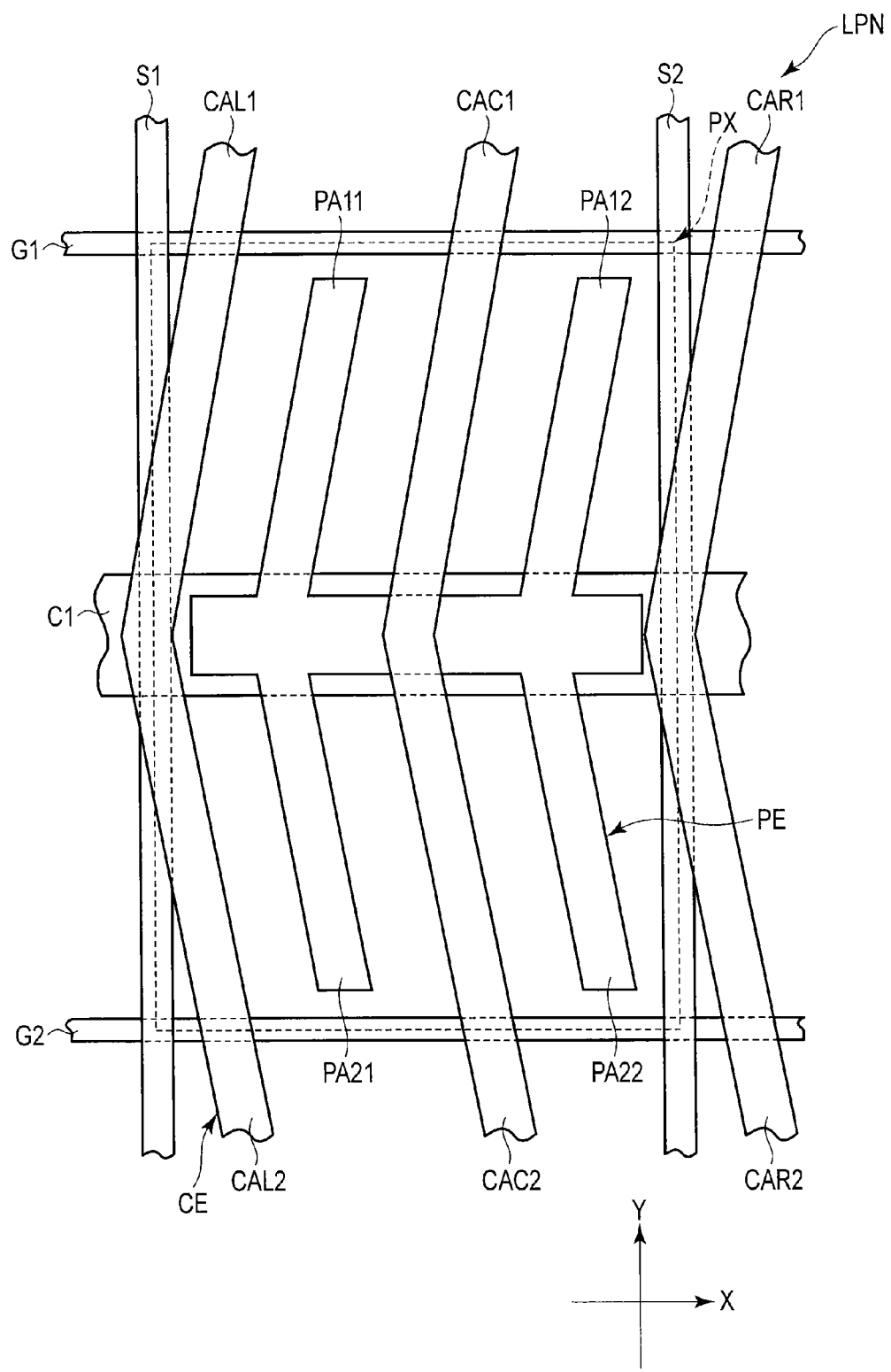
FIG. 8 is a plan view which schematically shows still another structure example of a pixel at a time when the liquid crystal display panel shown in FIG. 1 is viewed from the counter-substrate side.

FIG. 8 is a plan view which schematically shows still another structure example of the pixel PX at a time when the liquid crystal display panel LPN shown in FIG. 1 is viewed from the counter-substrate side.

This structure example differs from the structure example shown in FIG. 2 in that the pixel electrode PE and common electrode CE are bent, relative to the second direction Y.

Specifically, the pixel electrode PE includes a main pixel electrode PA11 and a main pixel electrode PA12 in an upper half part of the pixel PX, and includes a main pixel electrode PA21 and a main pixel electrode PA22 in a lower half part of the pixel PX. The main pixel electrode PA11 and main pixel electrode PA12 are arranged substantially in parallel with an interval in the first direction X, and are inclined at about 5° to 30° clockwise, relative to the second direction Y. The main pixel electrode PA21 and main pixel electrode PA22 are arranged substantially in parallel with an interval in the first direction X, and are inclined at about 5° to 30° counterclockwise, relative to the second direction Y. The main pixel electrode PA11 and main pixel electrode PA21 are continuous with each other with the sub-pixel electrode PB interposed, and are electrically connected. Similarly, the main pixel electrode PA12 and main pixel electrode PA22 are continuous with each other with the sub-pixel electrode PB interposed, and are electrically connected.

The common electrode CE includes a main common electrode CAL1, a main common electrode CAC1 and a main common electrode CAR1 in the upper half part of the pixel PX, and includes a main common electrode CAL2, a main common electrode CAC2 and a main common electrode CAR2 in the lower half part of the pixel PX. The main common electrode CAL1, main common electrode CAC1 and main common electrode CAR1 are arranged substantially in parallel with intervals in the first direction X, and extend in a direction substantially parallel to the main pixel electrode PA11 and main pixel electrode PA12. The main common electrode CAL2, main common electrode CAC2 and main common electrode CAR2 are arranged substantially in parallel with intervals in the first direction X, and extend in a direction substantially parallel to the main pixel electrode PA21 and main pixel electrode PA22. The main common electrode CAL1 and main pixel electrode CAL2 are continuous with each other and are electrically connected. The main common electrode CAC1 and main pixel electrode CAC2 are continuous with each other and are electrically connected. The main common electrode CAR1 and main pixel electrode CAR2 are continuous with each other and are electrically connected.

The inter-electrode distance between the main common electrode CAL1 and main pixel electrode PA11, the inter-electrode distance between the main common electrode CAC1 and main pixel electrode PA11, the inter-electrode distance between the main common electrode CAC1 and main pixel electrode PA12, and the inter-electrode distance between the main common electrode CAR1 and main pixel electrode PA12, are substantially equal. The inter-electrode distance between the main common electrode CAL2 and main pixel electrode PA21, the inter-electrode distance between the main common electrode CAC2 and main pixel electrode PA21, the inter-electrode distance between the main common electrode CAC2 and main pixel electrode PA22, and the inter-electrode distance between the main common electrode CAR2 and main pixel electrode PA22, are substantially equal.

In the structure example shown in FIG. 7 and FIG. 8, the distance between the main pixel electrode PA1 and main pixel electrode PA2 in one pixel, or the distance between the main pixel electrode PAH and main pixel electrode PA12, is 10 μm to 30 μm. In addition, the width of each of the main pixel electrodes is 2 μm to 3 μm.

In this structure example, too, the same advantageous effects as with the above-described structure examples can be obtained.

The inter-electrode distance between the main pixel electrode PA and main common electrode CA in the first direction X in the structure examples of FIG. 7 and FIG. 8 is at least double or more the inter-electrode distance in a liquid crystal device of IPS or FFS having a pixel electrode and a common electrode on the array substrate. In other words, since the common electrode CE for driving liquid crystal molecules LM are provided on the counter-substrate in the present embodiment, the inter-electrode distance on the array substrate necessarily becomes the distance between the neighboring pixel electrodes PE. Accordingly, in the case of the present embodiment, the distance between the electrodes on the array substrate (the distance between the pixel electrodes) is double or more the distance between the pixel electrode and the common electrode. According to the structure examples of the embodiment, compared to the liquid crystal device of IPS or FFS having the pixel electrode and common electrode on the array substrate, an area with asperities due to the pixel electrode PE and common electrode CE in one pixel is small, and a planar area is large. Since the area with asperities is small and the planar area is large, the area, which is not sufficiently subjected to alignment treatment in the alignment treatment process, becomes smaller than in the structure of IPS or FFS.

Like the structure example of FIG. 5 and FIG. 6, the alignment treatment direction crosses the wiring lines and the short sides of the pixel electrode in one rectangular pixel. Thus, even if there occurs a part which is not sufficiently subjected to alignment treatment, the area of such a part becomes smaller than in the case of other alignment treatment directions.

In the present embodiment, the structure of the pixel PX is not limited to the above-described examples.

The above-described examples relate to the structure in which the storage capacitance line is disposed immediately below the sub-pixel electrode PB. However, the gate line may be disposed immediately below the sub-pixel electrode PB. In addition, the position of disposition of the storage capacitance line may not be a substantially central part of the pixel, and the position of disposition of the gate line may not be the upper side end portion or lower side end portion of the pixel.

The above-described examples relate to the case in which the pixel electrode PE includes the main pixel electrode PA and sub-pixel electrode PB. However, the pixel electrode PE may not include the sub-pixel electrode PB, if the pixel electrode PE can be electrically connected to the switching element SW.

The above-described examples relate to the case in which the direction of extension of the main pixel electrode PA is the second direction Y. However, the main pixel electrode PA may extend in the first direction X. In this case, the direction of extension of the main common electrode CA is the first direction X. In addition, in this case, when the first wiring lines along the first direction X are the gate lines G, as in the above-described examples, the main common electrodes CA are opposed to the gate lines G. However, when the first wiring lines along the first direction X are the source lines S and the second wiring lines along the second direction Y are the gate lines G, the main common electrodes CA are opposed to the source lines S.

The above-described examples relate to the case in which in relation to the pixel electrode PE including the main pixel electrode PA corresponding to a first electrode, there is provided the common electrode CE including the main common electrodes CA as second electrodes located on both sides of the first electrode. Alternatively, in relation to the common electrode CE including the main common electrode CA corresponding to a first electrode, there may be provided the pixel electrode PE including the main pixel electrodes PA as second electrodes located on both sides of the first electrode.

The above-described examples relate to the case in which the common electrode CE includes the main common electrodes CA on the counter-substrate, but the embodiment is not limited to these examples. For example, the common electrode CE may include, in addition to the above-described main common electrodes CA, sub-common electrodes which are provided on the counter-substrate CT and are opposed to the gate lines G and storage capacitance line C. The sub-common electrodes extend in the first direction X and are formed integral or continuous with the main common electrodes CA.

The array substrate AR may include first shield electrodes which are located above the source lines S via an insulation film. The first shield electrodes extend in the second direction Y, are electrically connected to the main common electrodes CA within or outside the active area, and have the same potential as the common electrode CE. By the provision of the first shield electrodes, an undesired electric field from the source lines S can be shielded.

In addition, the array substrate AR may include second shield electrodes which are located above the gate lines G and storage capacitance line C via an insulation film. The second shield electrodes extend in the first direction X, and are electrically connected to the main common electrodes CA within or outside the active area. By the provision of the second shield electrodes, an undesired electric field from the gate lines G and storage capacitance line C can be shielded.

As has been described above, according to the present embodiment, there can be provided a liquid crystal display device which can reduce the manufacturing cost and can suppress degradation in display quality.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
    a first substrate including a first insulative substrate, a semiconductor layer formed on an inside of the first insulative substrate, a first interlayer insulation film covering the semiconductor layer, a gate line extending on the first interlayer insulation film in a first direction, a second interlayer insulation film covering the gate line, a first source line and a second source line extending, respectively, on the second interlayer insulation film in a second direction which is substantially perpendicular to the first direction, a switching element electrically connected to the gate line and the first source line, a pixel electrode which is located between the first source line and the second source line on the second interlayer insulation film, and is spaced apart from the first source line and the second source line, the pixel electrode being in contact with the semiconductor layer via a contact hole that penetrates the first interlayer insulation film and the second interlayer insulation film and having a strip shape extending on the second interlayer insulation film in the second direction, and a first alignment film directly covering the first source line, the second source line and the pixel electrode;
    a second substrate including a second insulative substrate, a common electrode which extends in the second direction and is opposed to each of the first source line and the second source line on both sides of the pixel electrode, on that side of the second insulative substrate, which is opposed to the first substrate, and a second alignment film covering the common electrode; and
    a liquid crystal layer including liquid crystal molecules held between the first substrate and the second substrate,
    wherein the first source line, the second source line, and the pixel electrode are formed directly on the second interlayer insulation film,
    a pixel partitioned by the gate line and the first and second source lines has a rectangular shape,
    the pixel electrode extends in a longitudinal direction of the pixel, is formed of an opaque wiring material, is formed of the same material as the first source line and the second source line, and is formed of a metallic material selected from the group consisting of aluminum (Al), titanium (Ti), silver (Ag), molybdenum (Mo), tungsten (W), copper (Cu) and chromium (Cr), or an alloy including one selected from said group,
    the common electrode is formed of an opaque wiring material, and is formed of a metallic material selected from the group consisting of aluminum (Al), titanium (Ti), silver (Ag), molybdenum (Mo), tungsten (W), copper (Cu) and chromium (Cr), or an alloy including one selected from the group, and
    the first alignment film is subjected to alignment treatment in a direction parallel to the longitudinal direction of the pixel.

2. The liquid crystal display device of claim 1, further comprising:
    a first polarizer which is disposed on an outer surface of the first insulative substrate and includes a first polarization axis; and
    a second polarizer which is disposed on an outer surface of the second insulative substrate and includes a second polarization axis having a positional relationship of crossed Nicols with the first polarization axis,
    wherein the first polarization axis is substantially parallel to the first direction or the second direction.

3. The liquid crystal display device of claim 2, wherein an initial alignment direction of the liquid crystal molecules in a state in which an electric field is not produced between the pixel electrode and the common electrode is substantially parallel to the second direction.

4. The liquid crystal display device of claim 3, wherein in a state in which an electric field is not produced between the pixel electrode and the common electrode, the liquid crystal molecules are splay-aligned or homogeneously aligned between the first substrate and the second substrate.

* * * * *